United States Patent [19]

Grundmann

[11] 3,756,757
[45] Sept. 4, 1973

[54] TIE BAR SPROCKET MOUNTING FOR INJECTION-MOLDING MACHINE

[75] Inventor: Volker R. Grundmann, Glastonbury, Conn.

[73] Assignee: Litton Industrial Products, Inc., New Britain, Conn.

[22] Filed: Apr. 5, 1971

[21] Appl. No.: 130,913

[52] U.S. Cl. ............... 425/192, 74/459, 100/257, 425/242, 425/450
[51] Int. Cl. ............................................. B29f 1/00
[58] Field of Search ............... 18/30 LM, 30 LT, 18/30 R, 16 T, 16 H, 16 R, 30 LE, 30 LD, 30 LF, 30 LA, 30 LV; 100/257; 74/89.15, 459, 424.8; 425/192, 450, 242

[56] References Cited
UNITED STATES PATENTS

| | | | |
|---|---|---|---|
| 3,093,863 | 6/1963 | Ehlert | 18/30 LV |
| 3,508,300 | 4/1970 | Allard et al. | 18/30 LM |
| 3,373,596 | 3/1968 | Moeller et al. | 100/257 X |
| 3,588,957 | 6/1971 | Schwartz | 425/242 X |
| 3,669,599 | 6/1972 | Snider et al. | 425/450 X |
| 3,433,290 | 3/1969 | Eggenberger et al. | 425/242 X |

FOREIGN PATENTS OR APPLICATIONS 982,000    1965    Great Britain .................... 18/30 LT

*Primary Examiner*—J. Spencer Overholser
*Assistant Examiner*—David S. Safran
*Attorney*—Robert S. Smith

[57] ABSTRACT

An injection-molding machine has a staionary platen and a movable clamp housing joined by tie bars which slidably carried within the clamp housing. Angular motion of a nut carried by threads on the tie bar drives the clamp housing towards and away from the stationary platen. The drive for the nut includes a sprocket suspension wherein the sprocket is carried by a support independent of the tie bar threads which reduce radial forces on the threads.

6 Claims, 3 Drawing Figures

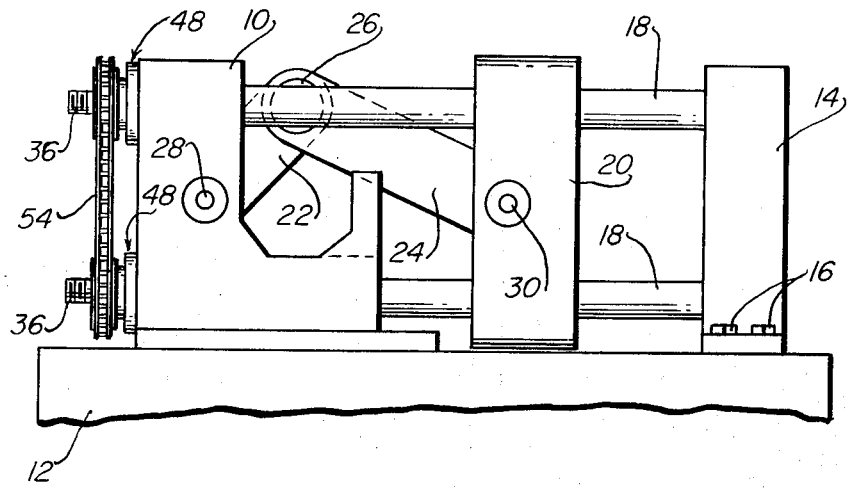
FIG_1
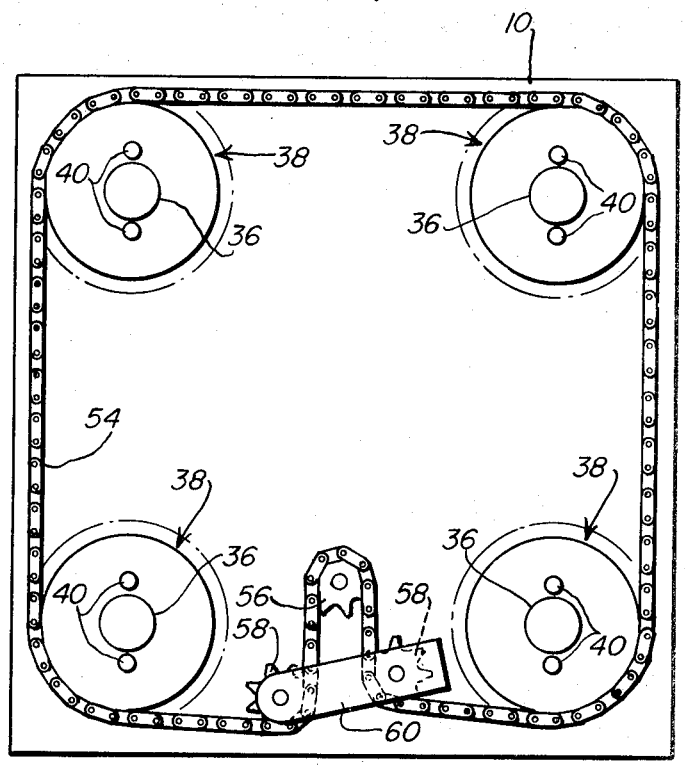
FIG_2
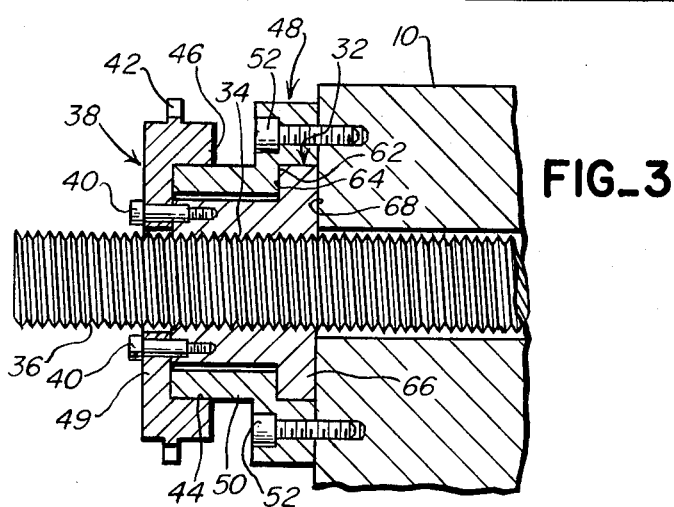
FIG_3
INVENTOR
VOLKER R. GRUNDMANN
BY Robert S. Smith
ATTORNEY

TIE BAR SPROCKET MOUNTING FOR INJECTION-MOLDING MACHINE

BACKGROUND OF THE INVENTION

Injection-molding machines have a stationary platen member and a clamp housing member are being used increasingly to mold a variety of products. Such machines typically have tie bars connecting the clamp housing and stationary platen. A nut carried by threads on each tie bar is angularly displaced to force the clamp housing away from or towards the stationary platen. The clamp housing is ordinarily bulky and heavy in nature because it provides space for clamp linkage to fold into the tremendous forces which are customarily used in the injection-molding operation. Accordingly the housing requires a substantial mechanism to drive it along a rectilinear path either towards or away from the stationary platen. Customarily this has been accomplished by a sprocket engaging a chain or alternatively a gear mounted on the threads of the tie bar. Because of the forces necessary to move the clamp housing, the chain, or gear engaging the sprocket carried on the tie bar member must necessarily impose a substantial radial load on the tie bar threads. This substantial load frequently results in undesirable wear or failures of the tie bar threads.

SUMMARY OF THE INVENTION

In accordance with the invention an injection-molding machine includes a clamp housing member and a stationary platen member; one of the members has a plurality of axially aligned apertures therein. A plurality of generally cylindrical tie bars is fixed to the other member and is cooperatively dimensioned for closely spaced sliding movement in the apertures. The tie bars have threads circumferentially disposed distal the fixed end thereof. Internally threaded nuts carried by each of the tie bars are provided having cooperatively dimensioned and configures surfaces for engagement with the tie bar threads. The nuts having a face for engagement with the one member. Generally circular drive means drivingly engages each of the nuts and means for supporting the drive means on the one member having a generally circular portion engaging the drive means is provided.

In the preferred embodiment of the invention the drive means, which may be either a sprocket or a gear, is provided with a shoulder engaging the generally circular portion of the means supporting the drive means. Most preferably the generally circular portion comprises a cylindrical extension engaging the shoulder of the drive means for concentric sliding torsional motion therebetween. The means supporting the driving means and the generally circular driving means have cooperating shoulders disposed generally perpendicularly to the axis of the tie bars whereby rotation of the drive means to move the nut away from the other member causes engagement of the shoulders and movement of the one member thereby movement of the one member in a direction parallel with the longitudinal axis of the tie bars.

Accordingly it is an object of the present invention to provide a novel injection-molding machine sprocket mounting which is capable of transmitting the required angular forces and which minimizes radial loads on the tie bar threads.

It is also an object of the invention to provide such a mounting which is capable of urging the clamp housing both towards and away from the stationary platen.

Still another object is to provide such a mounting which may be simply and economically constructed, which may be readily assembled and disassembled, and which is capable of long-lived operation.

BRIEF DESCRIPTION OF THE DRAWINGS

FIG. 1 is a simplified broken away side elevational view of an injection-molding machine embodying the present invention;

FIG. 2 is a simplified side elevational view to an enlarged scale of the chain drive shown in FIG. 1;

FIG. 3 is a side elevational view in partial section to a greatly enlarged scale showing in detail the sprocket suspension of the present invention.

DETAILED DESCRIPTION OF THE PREFERRED EMBODIMENT

Turning now in detail to the appended drawings, therein illustrated is an injection-molding machine including a clamp housing 10 which is carried for rectilinear sliding motion on a bed or base 12. Also carried by the stationary base 12 and fixedly attached thereto is a stationary platen 14 secured by bolts 16, 16. A plurality of tie bars 18, 18 which will most commonly number four fixedly engage the stationary platen 14 for sliding engagement in closely spaced relation within apertures (not shown) in clamp housing member 10. The apertures in the clamp housing 10 are disposed with their axes in aligned relationship to accommodate the parallel tie bars 18.

The tie bars 18 which are disposed in parallel relationship also pass through aligned apertures (not shown) in a movable platen 20 which is also mounted for sliding engagement with base 12. The movement of movable platen 20 is accomplished in the embodiment shown by means of a toggle linkage comprising links 22, 24 which are pivotally connected to each other and respectively to clamp housing 10 and movable platen 20. These pivotal connections are made with suitable pin connections 26, 28, 30. As best seen by referring also to FIGS. 2 and 3 the movement of clamp housing 10 with respect to stationary platen 14 is accomplished with nuts generally designated by the numerals 32 each having internal threads 34 engaging external threads 36 on each tie bar 18. Each nut 32 is angularly driven by a sprocket 38 in the preferred embodiment by means of shoulder bolts 40, 40. The mounting of the sprocket on the nut may also be by means of splines or a key and key way to transmit the necessary torsional energy without creating concentricity problems. The sprockets 38 are of generally circular shape having teeth 42 disposed about the outer periphery thereof and have a concentric central bore of greater diameter than the outside diameter of the tie bar threads 36 to provide clearance therebetween. The sprocket 38 has a shoulder 44 formed by the juncture of an annular rib 46 with the generally planar circular body portion 49 of the sprocket. The shoulder 44 engages support means 48 which has a generally cylindrical extension 50 at intersection with the shoulder 44 for concentric sliding angular motion therebetween. The support means 48 is counterbored to produce a shoulder 62 which cooperates with a shoulder 64 formed by a circumferential rib portion 66 of nut 32. The shoulders 62, 64 are disposed substantially perpendicularly to the axis of the tie bar 18. A generally planar face 68 abuts clamp housing 10. The support means 48 is fixedly secured to the clamp housing 10 by means of bolts 52, 52.

The rotation of each sprocket 38 is accomplished by means of a chain 54 which engages a sprocket 56 on a motor (not shown). Idler sprockets 58, 58 connected by plate 60 maintain tension on the chain 54.

In operation during the mold height adjustment procedure motor driven sprocket 56 is rotated to advance chain 54 and thereby each of the sprockets 38. With right hand threads on tie bars 18 and nuts 32 the rotation of the sprockets 38 clockwise as viewed in FIG. 3 causes the generally planar face 68 of each nut 32 to exert a force against clamp housing member 10 to urge it and movable platen 20 towards the stationary platen 14. In the opposite direction of angular movement shoulder 64 of each nut 32 engages shoulder 62 of support means 48 to urge clamp housing 10 by means of bolts 52 away from stationary platen 14. During this travel sprockets 38 rotate freely on the support means 48 without imposing a radial force on the screw threads 36 of tie bars 18.

After mold height adjustment has been accomplished by movement of the clamp housing the toggle linkage composed of links 22, 24 is repetitiously deflected towards the aligned position to provide conventional opening and closing of the mold (not shown) carried on movable platen 20 and stationary platen 14.

As will be appreciated, the sprocket suspension may differ from that illustrated herein. Although the specific embodiment so described is particularly preferred various means may be used to interconnect the support means, the nut, and the sprocket to allow relative angular motion and also to transmit forces aligned with a longitudinal axis of the tie bars and away from the clamp housing. The drive means may be a gear instead of a sprocket as illustrated, but the advantages inherent in the invention will still be manifest. Similarly the number of tie bars may be more or less than four and the means for moving the movable platen may alternatively be one or more hydraulic cylinders rather than the toggle linkage illustrated. The toggle may also vary structurally in manners well known in the molding industry.

Thus, it can be seen that the present invention provides a novel injection-molding machine sprocket suspension which is capable of transmitting the required angular forces without imposing radial loading on the tie bar teeth. It will additionally be seen that the invention as described will urge the clamp housing member both toward and away from the stationary platen using a structure which is simple and economical to construct and assemble, and as a result of its inherent simplicity is quite capable of long-lived operation.

I claim:

1. An injection-molding machine
   a. A clamp housing member and stationary platen member, one of said members having a plurality of apertures therein;
   b. A plurality of generally cylindrical tie bars, each of said bars being fixedly attached to the other of said members and cooperatively dimensioned and axially aligned for closely spaced sliding movement in one of said apertures, said tie bars having threads circumferentially disposed distal said fixed end;
   c. Internally threaded nuts carried by each of said tie bars, said nuts being cooperatively dimensioned and configured for engagement with said tie bar threads and having a face for engagement with said one member;
   d. Means for support engaging said one member and having a generally circular portion;
   e. Generally circular drive means drivingly engaging each of said nuts and said generally circular portion, said drive means having a shoulder engaging said means for support and having a shoulder extending over at least a portion of the periphery of said means for support.

2. An injection-molding machine as described in claim 1 wherein said means for support comprises a cylindrical extension engaging said shoulder for concentric sliding torsional motion therebetween.

3. An injection-molding machine as described in claim 2 wherein said means for support and said generally circular drive means have cooperating shoulders disposed generally perpendicularly to the axis of said tie bars whereby rotation of said drive means to move said nut away from said other member causes engagement of said shoulders and thereby movement of said one member in a direction parallel with the longitudinal axis of said tie bars.

4. An injection-molding machine as described in claim 1 wherein said generally circular drive means comprises a sprocket.

5. An injection-molding machine as described in claim 1 wherein said generally circular drive means comprises a gear.

6. An injection-molding machine as described in claim 4 wherein said sprocket is fixed to one of said nuts by bolts.

* * * * *